United States Patent
Berding et al.

(10) Patent No.: US 7,656,609 B1
(45) Date of Patent: Feb. 2, 2010

(54) DISK DRIVE MOTOR HAVING A ROTOR WITH AT LEAST THREE BENDABLE BALANCING TABS

(75) Inventors: Keith R. Berding, San Jose, CA (US); Shan-Shuong Chiou, Saratoga, CA (US); Yao-Hsin Huang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 450 days.

(21) Appl. No.: 11/435,172

(22) Filed: May 16, 2006

(51) Int. Cl.
*G11B 17/02* (2006.01)
(52) U.S. Cl. .................. 360/99.08; 360/98.07
(58) Field of Classification Search ........... 360/98.07, 360/98.08, 99.08, 99.12
See application file for complete search history.

(56) References Cited

U.S. PATENT DOCUMENTS

| | | | | |
|---|---|---|---|---|
| 4,095,484 | A | * | 6/1978 | Gautraud ................ 74/571.1 |
| 5,790,345 | A | * | 8/1998 | Alt ....................... 360/98.08 |
| 6,504,673 | B2 | * | 1/2003 | Choo et al. ............ 360/98.08 |
| 6,542,330 | B1 | | 4/2003 | Choo et al. |
| 6,594,109 | B2 | | 7/2003 | Renken |
| 6,885,118 | B2 | | 4/2005 | Fu et al. |
| 7,024,755 | B2 | * | 4/2006 | Fu et al. ................ 29/603.03 |
| 7,342,746 | B1 | * | 3/2008 | Lin ....................... 360/99.08 |

* cited by examiner

*Primary Examiner*—Jefferson Evans
(74) *Attorney, Agent, or Firm*—Barcelo & Harrison, LLP (57) ABSTRACT

A motor for use in a disk drive is disclosed. The motor includes a stator and a rotor. The rotor is rotably coupled to the stator and has an axis of rotation. The rotor includes a disk mounting hub. A plurality of bendable balancing tabs is attached to the rotor. The plurality of bendable balancing tabs includes at least three bendable balancing tabs disposed about the axis of rotation.

16 Claims, 6 Drawing Sheets

FIG. 8

US 7,656,609 B1

DISK DRIVE MOTOR HAVING A ROTOR WITH AT LEAST THREE BENDABLE BALANCING TABS

FIELD OF THE INVENTION

The present invention relates generally to motors for information storage devices, and in particular to a disk drive motor having a rotor with at least three bendable balancing tabs.

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes electronics and firmware for controlling the rotation of the spindle motor and for controlling the position of the HSA, and for providing a data transfer channel between the disk drive and its host.

The head stack assembly typically includes an actuator, at least one head gimbal assembly (HGA), and a flex cable assembly. Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface.

During operation of the disk drive, the actuator must rotate to position the heads adjacent desired information tracks on the disk. The actuator includes a pivot bearing cartridge to facilitate such rotational positioning. One or more actuator arms extend from the actuator body. An actuator coil is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk dive is not in use.

The spindle motor typically includes a rotor including one or more rotor magnets and a rotating hub on which disks mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

Excessive imbalance of the disk mounting hub, disk clamp, disk(s), and spacer rings (if any), can cause undesirable disk drive vibrations and associated customer complaints. In extreme cases, such vibrations might even degrade the ability of the actuator to position the heads adjacent desired information tracks on the disk. Therefore, it is advantageous to balance the hub, clamp, disk(s), and spacer rings (if any) while or after they are assembled together. Adding, removing, or moving mass in a single plane normal to the axis or rotation of the hub can counteract a net radial imbalance force on the rotor (i.e. a net imbalance force that would tend to dynamically translate the axis of rotation). Such single plane balancing can be accomplished, for example, by a balancing ring of appropriate size and mass affixed to the top of the disk clamp.

However, balancing in at least two planes is required to counteract both a net radial imbalance force on the rotor and a net tilting moment acting upon the rotor (i.e. a moment that would tend to dynamically tilt the axis of rotation). Such dual plane balancing is often cumbersome and expensive because it requires adding, removing, or moving mass in a second plane that is not easily accessible from the top of the motor hub after assembly of the disk(s), clamp, and spacer rings (if any). If a second balancing ring were placed lower on the hub, there would be insufficient access from the top to conveniently move (i.e. rotate) the second ring after disk drive assembly, for balancing purposes. Moreover, attempting to remove mass deep within the hub after disk assembly is generally impractical because of the likelihood of unacceptable particle generation and/or component damage while removing sufficient mass (especially if the hub is fabricated from a low mass density metal such as aluminum). Therefore, most conventional attempts at dual plane balancing of disk drive rotors have relied upon adding selected masses at different depths within receiving holes pre-bored into the hub. Such methods, although effective, are costly and cumbersome in a high-volume manufacturing environment because of the necessity to track inventory and part numbers for various masses having different desired characteristics (e.g. different mass and/or different center of gravity offset from the bottom of the receiving hole).

Thus, there is a need in the art for an improved balancing structure for a disk drive motor that is suitable for use in a high-volume manufacturing environment.

SUMMARY

A motor for use in a disk drive is disclosed. The motor includes a stator and a rotor. The rotor is rotably coupled to the stator and has an axis of rotation. The rotor includes a disk mounting hub. A plurality of bendable balancing tabs is attached to the rotor. The plurality of bendable balancing tabs includes at least three bendable balancing tabs disposed about the axis of rotation.

DESCRIPTION OF THE PREFERRED EMBODIMENTS

Figure 1:
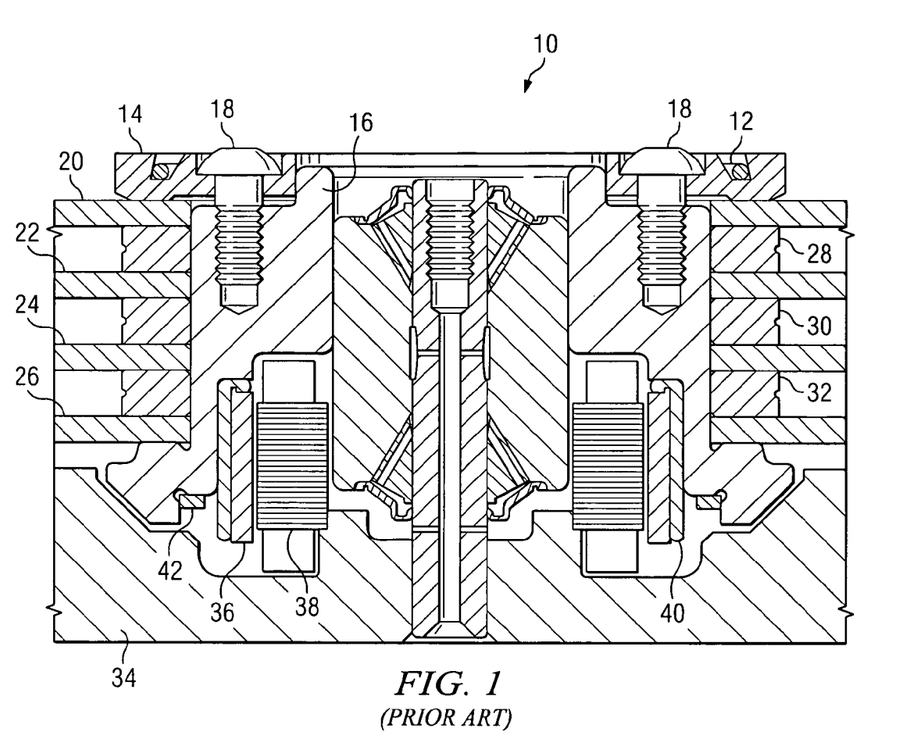
FIG. 1 is a cross sectional view of a disk drive motor having a conventional balancing ring at the top of the disk clamp.

FIG. 1 is a cross sectional view of a disk drive motor 10 having a conventional upper balancing ring 12 at the top of a disk clamp 14. The disk clamp 14 is attached to a top portion of a disk mounting hub 16 by fasteners 18. The disk clamp 14 clamps four disks 20, 22, 24, 26 and three spacer rings 28, 30, 32 to the disk mounting hub 16 so that those disks and spacer rings rotate with the disk mounting hub 16. The clamp 14 and upper balancing ring 12 also rotates with the disk mounting hub 16. The upper balancing ring 12 typically includes a gap (not shown in this view) somewhere along its circumference so that it is an open ring rather than a closed ring. The gap constitutes a region of reduced mass that can be angularly positioned on the hub to help balance the hub. Mechanical interference between a free position of the upper balancing ring 12 and a corresponding groove in the disk clamp 14 creates a radial force that, through friction, resists incidental re-positioning of the upper balancing ring 12 (while allowing deliberate re-positioning during balancing). The motor 10 also includes a lower balancing ring 42 at the bottom of hub 16. Re-positioning of the lower balancing ring 42 after disk drive assembly is difficult or impossible because the lower balancing ring 42 is not accessible from above hub 16. The motor 10 further comprises a stator 34 that includes electromagnetic coils 38, and a rotor that includes hub 16 and at least one magnet 36 that may be attached to the hub 16 via a ferromagnetic backing plate 40.

Figure 2:
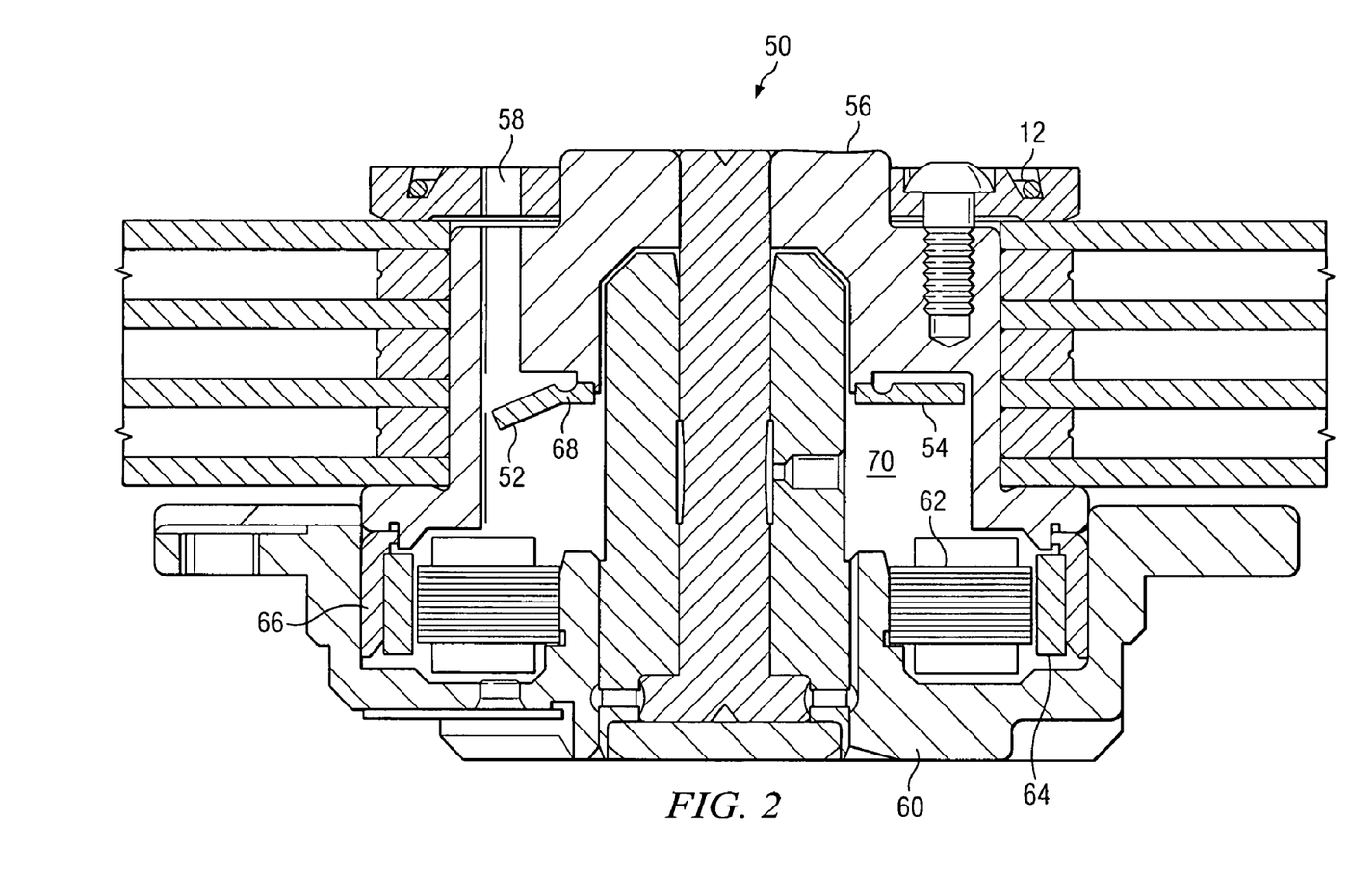
FIG. 2 is a cross sectional view of a disk drive motor having bendable balancing tabs in accordance with an embodiment of the present invention in which the bendable balancing tabs are internal within a cavity of the hub, and in which the bendable balancing tabs are accessed from above.

FIG. 2 is a cross sectional view of a disk drive motor 50 having at least three bendable balancing tabs 52, 54 in accordance with an embodiment of the present invention in which the bendable balancing tabs 52, 54 are internal within a cavity 70 of a hub 56, and in which the bendable balancing tabs 52, 54 are accessed from above via holes 58. In the embodiment of FIG. 2, the holes 58 are positioned over the bendable balancing tabs in a direction parallel to the axis of rotation. In the embodiment shown in FIG. 2, bendable balancing tab 52 is shown in an optionally bent position, while bendable balancing tab 54 is shown in an optionally un-bent position. The balancing tabs can be fabricated from various massive materials, including zinc or stainless steel, for example by stamping, forging, metal-injection molding, casting, etc.

The motor 50 of the embodiment of FIG. 2 also includes a stator 60 including electromagnetic coils 62, and a rotor that includes hub 56 and magnets 64 attached to hub 56 via ferromagnetic backing plates 66. The disk clamp, upper balancing ring, disks, and spacer rings of motor 50 are the same as or similar to those of motor 10 depicted in FIG. 1. In the embodiment of FIG. 2, the upper balancing ring 12 can be considered to be a top balancing structure, while the bendable balancing tabs 52 can be considered to be a lower balancing structure.

During balancing of motor 50, a tool could pass through one or more of holes 58 to deliberately bend one or more of balancing tabs 52. In the embodiment of FIG. 2, the tool (not shown) could be as simple as a rod having lesser diameter than hole 58, for bending balancing tab 52 down. In an alternative embodiment, the tool could include a hook at its end connectable to a mating hole or slot in balancing tab 52, so that the tool could bend balancing tab 52 up or down. In either case, such bending could cause plastic deformation at least in region 68 of the at least one balancing tab 52, leaving the at least one balancing tab 52 in a new position after the tool is removed from hole 58. A center of gravity of the balancing tab 52 would be shifted, for example downward and radially inward, as a result of such bending. The amount of shift (if any) would be selected to help balance the motor 50, based on the results of an earlier conventional out-of-balance estimation.

In the embodiment of FIG. 2, balancing tabs 52 are initially oriented in a plane that is generally orthogonal to the axis of rotation, but the aforementioned tool may be used to later bend one or more of the balancing tabs 52 out of that plane by some plastic deformation angle (e.g. 10-60 degrees). Note that in the embodiment of FIG. 2, any plane that is normal to the axis of rotation and that passes through any of the plurality of bendable balancing tabs 52 does not also pass through the upper balancing ring 12.

Figure 3:
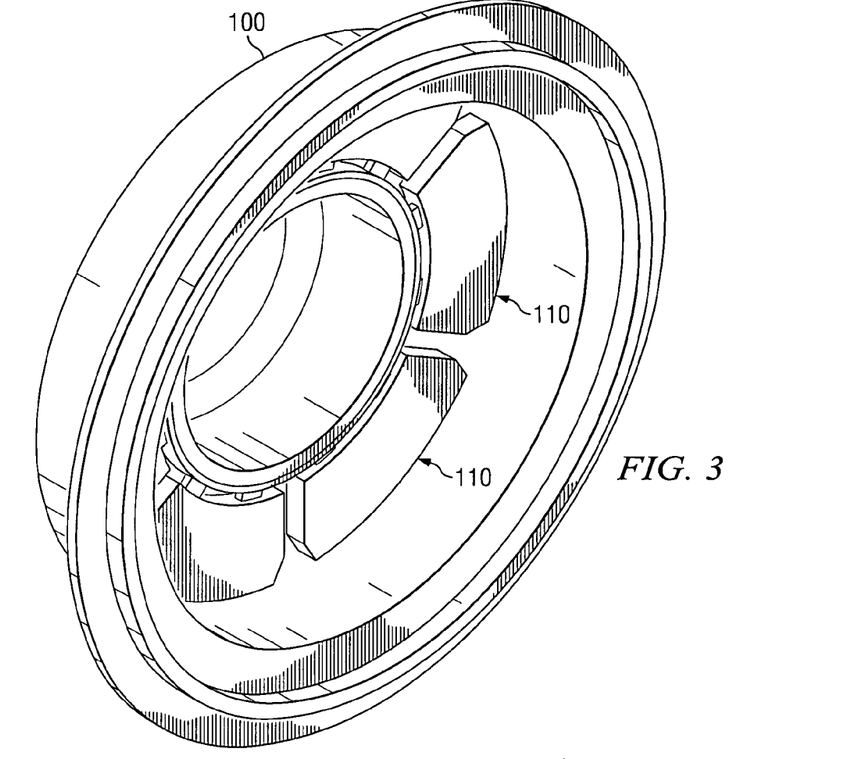
FIG. 3 is a perspective view from under the hub, of bendable balancing tabs in accordance with an embodiment of the invention where the balancing tabs are internal to the hub.

FIG. 3 is a perspective view from under a disk mounting hub 100, the disk mounting hub 100 including six bendable balancing tabs 110 in accordance with an embodiment of the invention where the balancing tabs 110 are internal to the hub 100.

Figure 4:
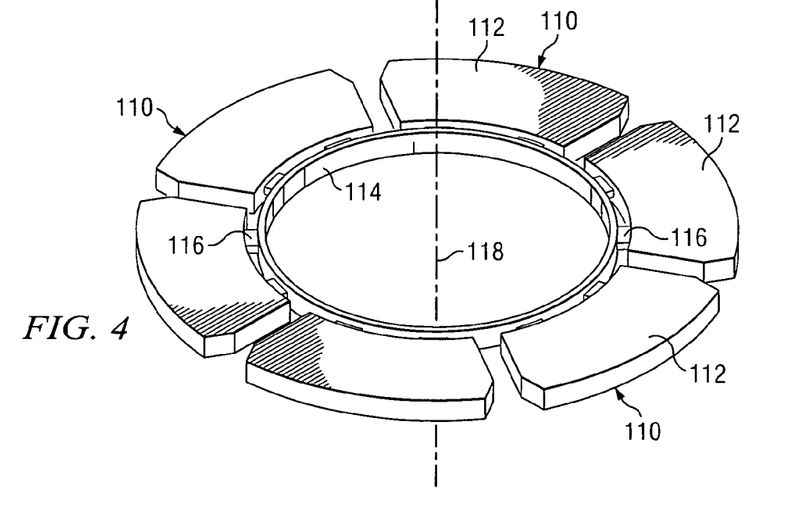
FIG. 4 is a perspective view of a plurality of balancing tabs connected to a common tab ring in accordance with an embodiment of the present invention.

FIG. 4 is a perspective view of six balancing tabs 110 connected to a common tab ring 114 in accordance with an embodiment of the invention. Each of the six bendable balancing tabs 110 also includes a balancing mass region 112 and at least one plastic deformation region 116 located closer to the axis of rotation 118 than the balancing mass region 112. The plastic deformation regions 116 facilitate at least one tab 110 to be optionally bent out of the plane of the other balancing tabs 110. The at least one plastic deformation region 116 of FIG. 4 has a lower bending stiffness than the balancing mass region 112. In certain embodiments, the bending stiffness of the at least one plastic deformation region 116 may be less than one tenth that of the balancing mass region 112. Such lower bending stiffness can be achieved by thinning or narrowing the plastic deformation region 116. For example, in certain embodiments the thickness of the balancing mass region 112 may be more than twice that of the at least one plastic deformation region 116.

In the embodiment of FIG. 4, six bendable balancing tabs 110 are shown attached to common tab ring 114, but in other embodiments there can be as few as three balancing tabs, or more than six (e.g. twelve). Preferably, the plurality of bendable balancing tabs 110 and the common tab ring 114 are a single part having material continuity rather than being an assembly of sub-parts. However, in certain alternative embodiments the bendable balancing tabs may be assembled with the common tab ring as an assembly of sub-parts. The common tab ring 114 may be attached to a surface of an inner cavity of a disk mounting hub, such as inner cavity 70 depicted in FIG. 2. In the embodiment of FIG. 4, the common tab ring 114 is disposed closer the axis of rotation 118 than any of the bendable balancing tabs 110. However, in certain alternative embodiments (not shown) the common tab ring 114 and the plastic deformation regions 116 may be disposed further from the axis of rotation 118 than any of the bendable balancing tabs 110, such that the bendable balancing tabs 110 are internal to the common tab ring 114 and the outside of the common tab ring 114 is attached to an inner surface of the disk mounting hub.

Figure 5:
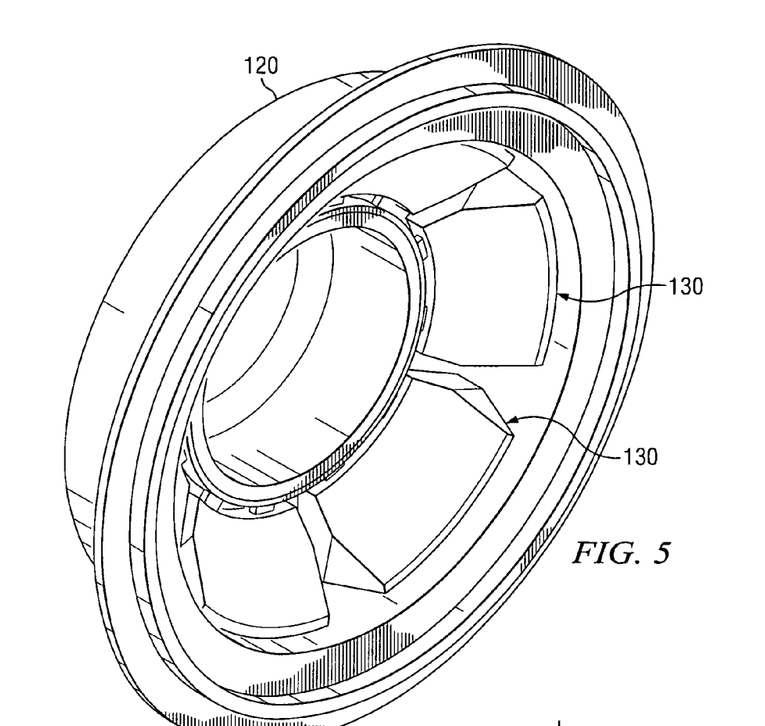
FIG. 5 is a perspective view from under the hub, of bendable balancing tabs in accordance with an embodiment of the invention where the balancing tabs are internal to the hub.

FIG. 5 is a perspective view from under a disk mounting hub 120, the disk mounting hub 120 including six bendable balancing tabs 130 in accordance with an embodiment of the invention where the balancing tabs 130 are internal to the hub 120.

Figure 6:
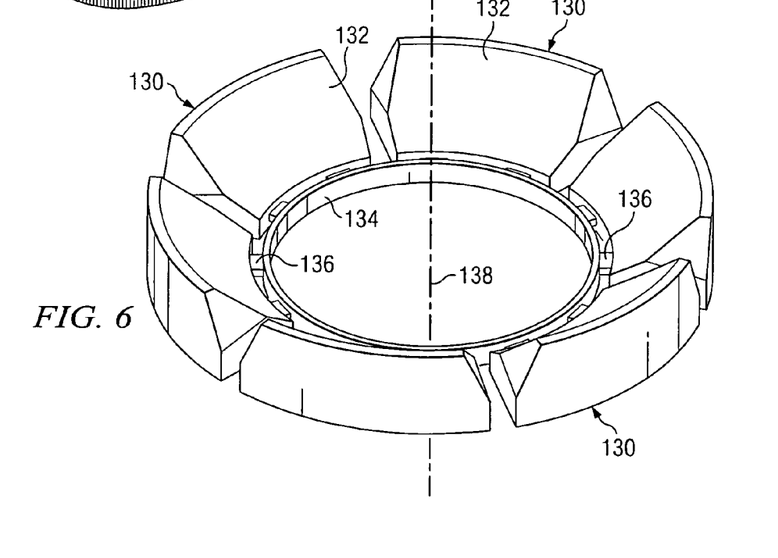
FIG. 6 is a perspective view of a plurality of balancing tabs connected to a common tab ring in accordance with an embodiment of the present invention.

FIG. 6 is a perspective view of six balancing tabs 130 connected to a common tab ring 134 in accordance with an embodiment of the present invention. Each of the six bendable balancing tabs 130 also includes a balancing mass region 132 and at least one plastic deformation region 136 located closer to the axis of rotation 138 than the balancing mass region 132. The plastic deformation regions 136 facilitate at least one tab 130 to be optionally bent out of the plane of the other balancing tabs 130. The at least one plastic deformation region 136 of FIG. 6 has a lower bending stiffness than the balancing mass region 132. In certain embodiments, the bending stiffness of the at least one plastic deformation region 136 may be less than one tenth that of the balancing mass region 132. Such lower bending stiffness can be achieved by thinning or narrowing the plastic deformation region 136. For example, in certain embodiments the thickness of the balancing mass region 132 may be more than twice that of the at least one plastic deformation region 136.

In the embodiment of FIG. 6, six bendable balancing tabs 130 are shown attached to common tab ring 134, but in other embodiments there can be as few as three balancing tabs, or more than six (e.g. twelve). Preferably, the plurality of bendable balancing tabs 130 and the common tab ring 134 are a single part having material continuity rather than being an assembly of sub-parts. However, in certain alternative embodiments the bendable balancing tabs may be assembled with the common tab ring as an assembly of sub-parts. The common tab ring 134 may be attached to a surface of an inner cavity of a disk mounting hub, such as inner cavity 70 depicted in FIG. 2. In the embodiment of FIG. 6, the common tab ring 134 is disposed closer the axis of rotation 138 than any of the bendable balancing tabs 130. However, in certain alternative embodiments (not shown) the common tab ring 134 and the plastic deformation regions 136 may be disposed further from the axis of rotation 138 than any of the bendable balancing tabs 130, such that the bendable balancing tabs 130 are internal to the common tab ring 134 and the outside of the common tab ring 134 is attached to an inner surface of the disk mounting hub.

Figure 7:
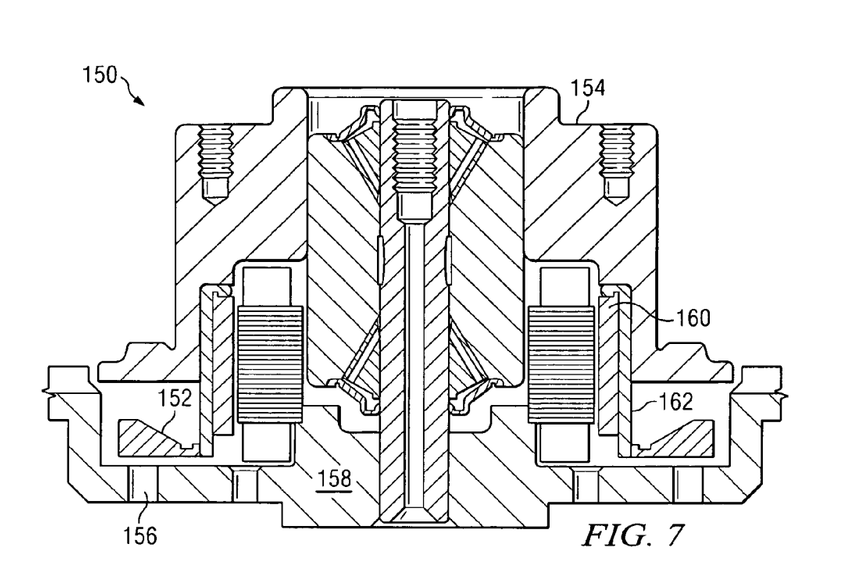
FIG. 7 is a is a cross sectional view of a disk drive motor having bendable balancing tabs in accordance with an embodiment of the present invention in which the bendable balancing tabs are below the hub rather than being internal to any hub cavity, and in which the bendable balancing tabs are accessed from below.

FIG. 7 is a is a cross sectional view of a disk drive motor 150 having bendable balancing tabs 152 in accordance with an embodiment of the present invention in which the bendable balancing tabs 152 are below a disk mounting hub 154 rather than being internal to any hub cavity, and in which the bendable balancing tabs 152 are accessed from below via at least one hole 156 in stator 158. Motor 150 includes at least one magnet 160 and a ferromagnetic metal backing piece 162 that is adjacent to and magnetically coupled to the at least one magnet 160. In the embodiment of FIG. 7, the plurality of bendable balancing tabs 152 and the ferromagnetic metal backing piece 162 are shown to be an assembly of sub-parts, but alternatively, they may be a single part having material continuity.

Figure 8:
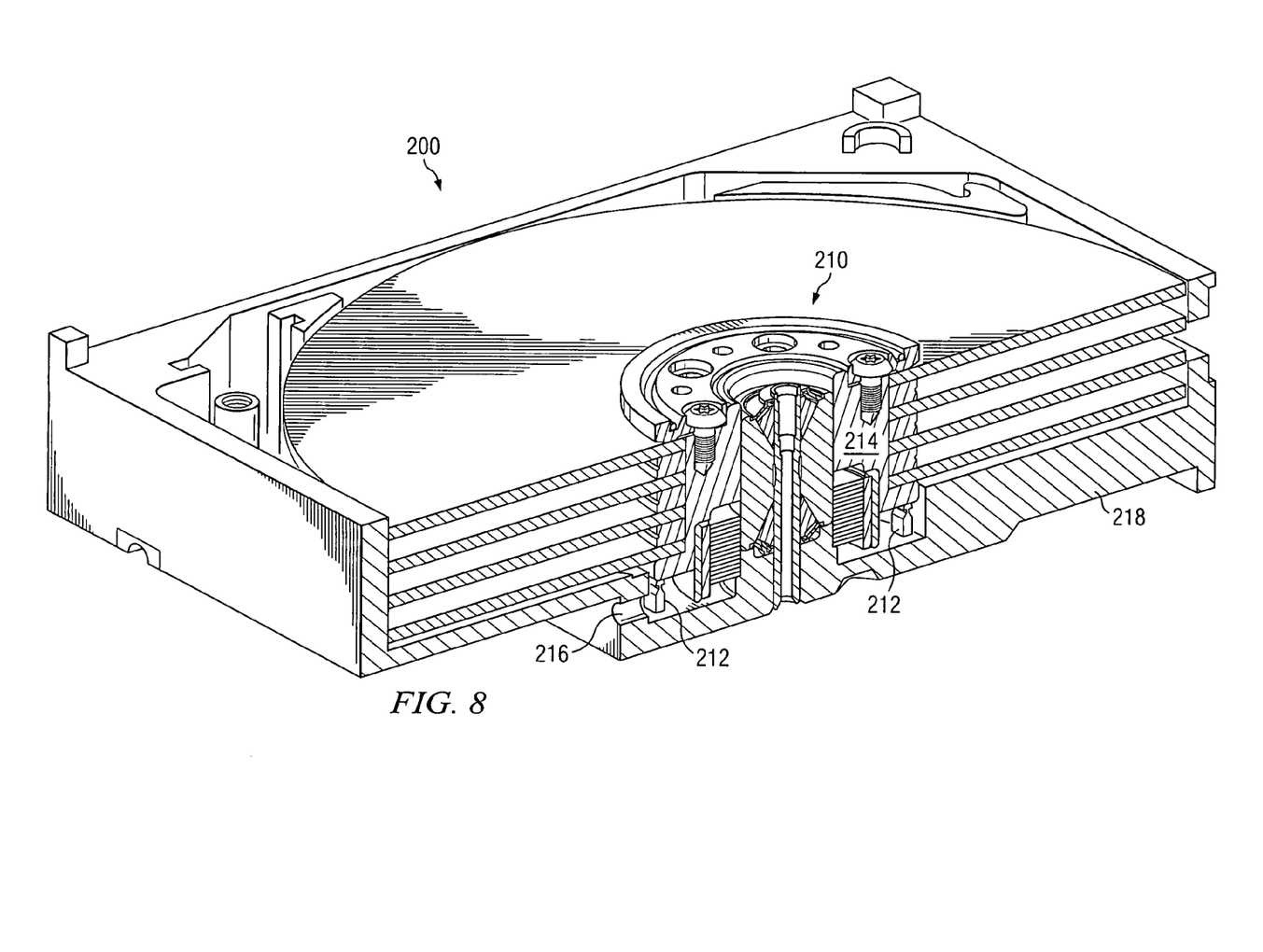
FIG. 8 is a perspective cross sectional view of a disk drive having a motor with bendable balancing tabs in accordance with an embodiment of the present invention in which the bendable balancing tabs are below the hub rather than being internal to any hub cavity, and in which the bendable balancing tabs are accessed from the side.
Figure 9:
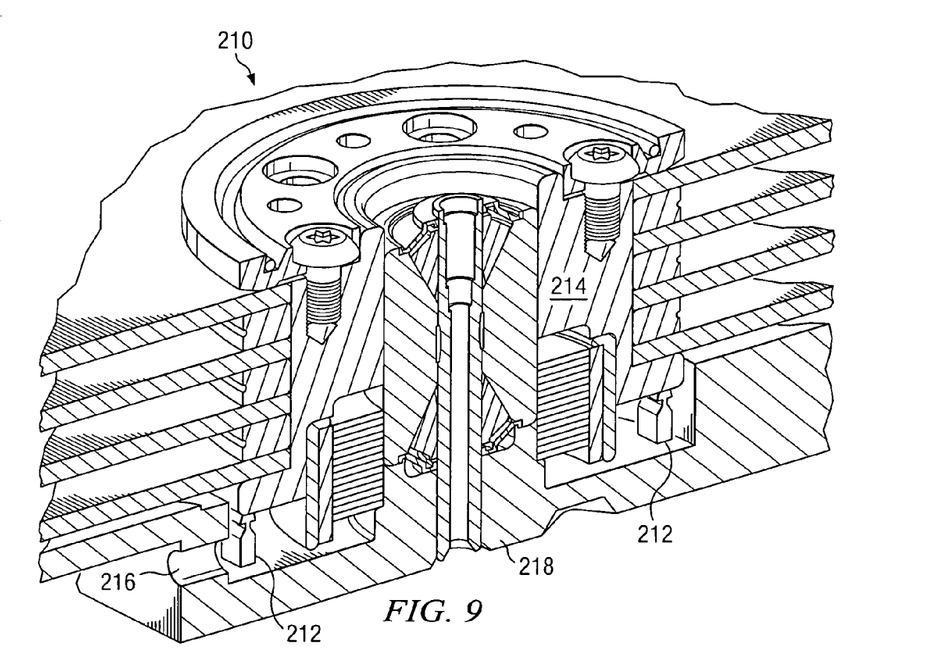
FIG. 9 is a perspective cross sectional view of a disk drive motor with bendable balancing tabs in accordance with an embodiment of the present invention in which the bendable balancing tabs are below the hub rather than being internal to any hub cavity, and in which the bendable balancing tabs are accessed from the side.

FIG. 8 is a perspective cross sectional view of a disk drive 200 having a motor 210 with bendable balancing tabs 212 in accordance with an embodiment of the present invention in which the bendable balancing tabs 212 are below the hub 214 rather than being internal to any hub cavity, and in which the bendable balancing tabs 212 are accessed from the side via at least one hole 216 in stator 218. FIG. 9 depicts a closer view of motor 210. In the embodiment of FIG. 8 and FIG. 9, the hole 216 is sequentially in approximate radial alignment with each of the bendable balancing tabs 212 as the rotor is rotated.

During balancing, a tool (not shown) may be optionally inserted in hole 216 to bend one or more balancing tabs 212 by a plastic deformation angle. Balancing tabs 212 are initially oriented in a plane that is generally parallel to the axis of rotation of motor 210. In the embodiment of FIG. 8 and FIG. 9, the plastic deformation angle is preferably not more than 60 degrees. In the embodiment of FIG. 9, the aforementioned tool could be as simple as a rod having lesser diameter than hole 216, for bending balancing tab 212 inward. In an alternative embodiment, the tool could include a hook at its end connectable to a mating hole or slot in balancing tab 212, so that the tool could bend balancing tab 212 inward or outward. In either case, such bending could cause plastic deformation at least in region 220 of the at least one balancing tab 212, leaving the at least one balancing tab 212 in a new position after the tool is removed from hole 216. A center of gravity of the balancing tab 212 would be shifted, for example radially inward and upward, as a result of such bending.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

We claim:

1. A motor for use in a disk drive, the motor comprising:
a stator;
a rotor being rotably coupled to the stator and having an axis of rotation, the rotor including a disk mounting hub; and
a plurality of bendable balancing tabs attached to the rotor and disposed about the axis of rotation, the plurality of bendable balancing tabs including at least three bendable balancing tabs,
wherein the disk mounting hub includes an inner cavity and the plurality of bendable balancing tabs are disposed within the inner cavity.

2. The motor of claim 1 wherein the disk mounting hub includes a plurality of holes, the holes being positioned over each of the bendable balancing tabs in a direction parallel to the axis of rotation.

3. The motor of claim 1 wherein the stator includes at least one hole that is sequentially in approximate radial alignment with each of the bendable balancing tabs as the rotor is rotated, there being no intervening structure between said one hole and said each of the bendable balancing tabs when in approximate radial alignment, so that said each of the bendable balancing tabs is accessible via said one hole when in approximate radial alignment.

4. The motor of claim 1 wherein the plurality of bendable balancing tabs includes at least six but not more than 12 bendable balancing tabs.

5. The motor of claim 1 wherein each of the plurality of bendable balancing tabs is connected to a common tab ring, the common tab ring being attached to a surface of the inner cavity and the common tab ring being disposed closer to the axis of rotation than any of the bendable balancing tabs.

6. The motor of claim 5 wherein the plurality of bendable balancing tabs and the common tab ring are a single part having material continuity rather than being an assembly of sub-parts.

7. The motor of claim 1 wherein the plurality of bendable balancing tabs and the disk mounting hub are a single part having material continuity rather than being an assembly of sub-parts.

8. The motor of claim 1 wherein the plurality of bendable balancing tabs comprises zinc.

9. The motor of claim 1 wherein the plurality of bendable balancing tabs comprises stainless steel.

10. The motor of claim 1 wherein each bendable balancing tab can be individually bent as much as 60 degrees from a plane normal to the axis of rotation.

11. A motor for use in a disk drive, the motor comprising:
a stator;
a rotor being rotably coupled to the stator and having an axis of rotation, the rotor including a disk mounting hub; and
a plurality of bendable balancing tabs attached to the rotor and disposed about the axis of rotation, the plurality of bendable balancing tabs including at least three bendable balancing tabs,
wherein each bendable balancing tab includes a balancing mass region and at least one plastic deformation region located closer to the axis of rotation than the balancing mass region, the at least one plastic deformation region having lower bending stiffness than the balancing mass region, and
wherein a thickness of the balancing mass region exceeds that of the at least one plastic deformation region.

12. The motor of claim 11 wherein a bending stiffness of the at least one plastic deformation region is less than one tenth that of the balancing mass region.

13. The motor of claim 11 wherein a thickness of the balancing mass region is at least twice that of the at least one plastic deformation region.

14. A motor for use in a disk drive, the motor comprising:
a stator;
a rotor being rotably coupled to the stator and having an axis of rotation, the rotor including a disk mounting hub; and
a plurality of bendable balancing tabs attached to the rotor and disposed about the axis of rotation, the plurality of bendable balancing tabs including at least three bendable balancing tabs,
wherein the rotor further comprises at least one magnet and a ferromagnetic metal backing piece that is adjacent to and magnetically coupled to the at least one magnet, and the plurality of bendable balancing tabs and the ferromagnetic metal backing piece are a single part having material continuity rather than being an assembly of sub-parts.

15. A motor for use in a disk drive, the motor comprising:
a stator;
a rotor being rotably coupled to the stator and having an axis of rotation, the rotor including a disk mounting hub; and
a plurality of bendable balancing tabs attached to the rotor and disposed about the axis of rotation, the plurality of bendable balancing tabs including at least three bendable balancing tabs; and
further comprising a disk clamp that is attached to a top portion of the disk mounting hub, and a top balancing structure that is disposed on the disk clamp, wherein any plane that is normal to the axis of rotation and that passes through any of the plurality of bendable balancing tabs does not also pass through the top balancing structure.

16. A motor for use in a disk drive, the motor comprising:
a stator;
a rotor being rotably coupled to the stator and having an axis of rotation, the rotor including a disk mounting hub; and
a plurality of bendable balancing tabs attached to the rotor and disposed about the axis of rotation, the plurality of bendable balancing tabs including at least three bendable balancing tabs; and
further comprising a disk clamp that is attached to a top portion of the disk mounting hub, and a top balancing structure that is disposed on the top portion of the disk mounting hub, wherein any plane that is normal to the axis of rotation and that passes through any of the plurality of bendable balancing tabs does not also pass through the top balancing structure.

* * * * *